Nov. 3, 1931.  J. O. ALMEN  1,830,732
FUEL SYSTEM FOR SUPERCHARGED ENGINES
Filed March 31, 1928
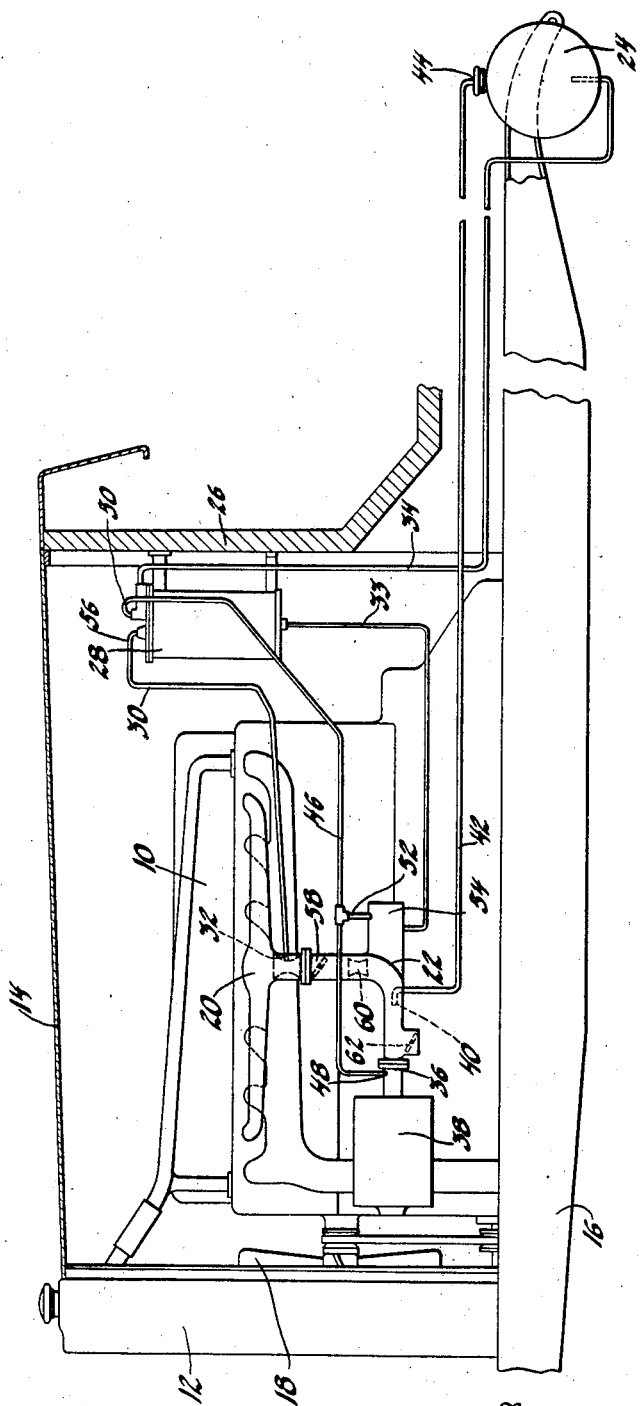
Inventor
John O. Almen
By
Attorneys Patented Nov. 3, 1931

1,830,732

UNITED STATES PATENT OFFICE

JOHN O. ALMEN, OF ROYAL OAK, MICHIGAN, ASSIGNOR TO GENERAL MOTORS RESEARCH CORPORATION, OF DETROIT, MICHIGAN, A CORPORATION OF DELAWARE

FUEL SYSTEM FOR SUPERCHARGED ENGINES

Application filed March 31, 1928. Serial No. 266,313.

This invention relates to internal combustion engines and has particular reference to engines used on automotive vehicles.

The invention is particularly concerned with the application of a supercharger and means for applying or transmitting supercharger pressure to all the necessary and interrelated parts which are concerned in the proper functioning of the fuel system of the engine. It is known that in the past certain systems have been in use wherein the supercharger pressure has been applied to the fuel tank or to the carburetor, or to both, but none, insofar as I am aware, appears to have previously adapted or constructed any system or arrangement which will provide for the excess or supercharger pressure being applied to the conventional vacuum tank used on automotive vehicles. The vacuum tank is connected to the intake manifold and the suction therein operates to draw the fuel from the fuel container and deliver it to the carburetor through the tank.

It is the object of the present invention to devise an arrangement which will permit of obtaining supercharger pressure at the carburetor, the fuel container, and the vacuum tank of an automotive vehicle. It has been found in practice that if the vacuum tank does not have the supercharger pressure applied thereto and is subject to operation only by the ordinary pressure in the atmospheric air, that the efficient operation of the vacuum tank will be partially interfered with and if the supercharger pressure is extremely high, the operation of the vacuum tank will be greatly impaired due to back pressure through the carburetor.

With the arrangement of the present invention there is an equalized pressure at all parts of the system similarly as there is an equal pressure when no supercharger is used. The distinction of the present invention over ordinary conditions is that the equalized pressure in all parts of the system is a higher or supercharger pressure.

The object of the invention is accomplished by connecting to the discharge end of the supercharger a suitable system of pipes, one of which leads to the upper portion of the gas tank while a second one passes to the vacuum tank and has a branch line which leads to the float chamber of the carburetor. The ends of the lines from the supercharger outlet to the various parts may be in the form of a Pitot tube, or may be straight if desired. The vacuum tank has the usual leads to any suitable portion of the intake manifold and to the carburetor float chamber.

The invention is disclosed on the accompanying drawing, the figure being a side view of a portion of an automotive vehicle with the hood removed and parts shown in section and broken away to more clearly illustrate the invention.

Referring to the drawing, the numeral 10 indicates an internal combustion engine, 12 the radiator and 14 the hood which rests on a chassis 16. The engine has the usual fan 18, an intake manifold 20 and carburetor 22, while the chassis has positioned at preferably the rear end thereof the fuel tank 24. The cowl pan is shown at 26 and to this cowl pan there is secured the vacuum tank 28 having a lead 30 connected to the intake manifold 20, as shown at 32, and a second lead 33 for conducting the fuel to the float chamber 54 of the carburetor 22. The gas tank and vacuum tank are interconnected by means of a pipe line 34. The parts above described are all conventional and per se form no part of the present invention.

Connected to the carburetor by means of a pipe 36 is a supercharger 38 of any suitable type and preferably driven from its front end by any suitable connection, such as from the fan pulley, the cam shaft, or from the crankshaft direct. The pipe 36 leads to the carburetor 22, and when the supercharger is operating it will force the atmospheric air through the pipe 36, through the carburetor 22 and on to the intake manifold 20.

The outlet pipe 36 has opening thereinto the end 40 of a pipe line 42, the rear end 44 of which is connected to the upper portion of a fuel container 24. The end 40 is shown in the form of a Pitot tube, but if desired, it may be left straight. As the supercharger forces the air through the pipe 36 a portion thereof will pass through the pipe 40 and on to the fuel tank 24 and thereby causing supercharger pressure to be exerted within the fuel container and aiding the transmission of fuel from the container 24 to the vacuum tank 28.

A second pipe line 46 opens into the pipe 36 from the supercharger as shown at 48. This pipe lead 46 leads to the upper portion of the vacuum tank 28, as shown at 50 and has a branch line 52, which is connected to the float chamber 54 of the carburetor 22. Inasmuch as the opening in the end 48 of the pipe line 46 is capable of receiving the discharged air from the supercharger, it will be obvious that supercharger pressure will therefore, be delivered to the vacuum tank 28 as well as to the float chamber 54 of the carburetor. If desired, a by-pass controlled by a valve 62 may be provided to throw the supercharger pressure to the atmosphere.

The carburetor 22 and manifold 20 are interconnected by a riser 58 and in this riser a restriction 60 is placed so as to give a pressure difference or drop between the supercharger and the manifold.

The operation of the vacuum tank is well known and a very brief description it is believed will suffice. The terminus 50 of the pipe 46 and the terminus 56 of the pipe 30 lead from and to respectively the upper portion of the vacuum tank 28 and are controlled by valves which are simultaneously operated so that but one of the pipes 30 or 46 will be in communication with the vacuum tank at one time. The lead or pipe 46 replaces the usual or conventional lead from the vacuum tank to the atmosphere. It is believed obvious that the pressure from the supercharger delivered from the pipe 46 will cause a more ready flow of gasoline from the vacuum tank 28 through the pipe 33 to the float chamber than if ordinary atmospheric pressure conditions maintained, for the reason that the supercharger pressure is higher than atmospheric.

The structure of the present invention was built and placed in operation and proved to be very successful in practice. The equalization of pressure at all points of the system gave much better results than have been obtained by partial supercharger pressure operated systems heretofore in use.

Instead of the two ends 40 and 48 opening into the outlet pipe 36, a single lead such as 46, 48 may be used and the pipe 42 connected to the pipe 46 at any suitable point.

I claim:

1. In combination with an automotive vehicle having an internal combustion engine and a fuel container, a carburetor and a vacuum tank associated with said engine, said tank adapted to draw fuel from the container to supply the carburetor, a supercharger operatively connected with said engine, and means to maintain supercharger pressure in said tank and in said fuel container.

2. In combination with an automotive vehicle having an internal combustion engine and a fuel container, a carburetor associated with said engine, a tank connected to the intake manifold of the engine to draw fuel from the container to supply the carburetor, a supercharger operatively connected with said engine, a pipe leading from the supercharger to the fuel container to maintain supercharger pressure therein and a pipe leading from the supercharger to the tank to maintain supercharger pressure therein.

3. In combination with an automotive vehicle having an engine and a fuel container, a carburetor associated with said engine, a vacuum tank associated with the engine and adapted to draw fuel from the container to supply the carburetor, a supercharger operatively connected to said engine, means for maintaining supercharger pressure in the vacuum tank, said means embodying a means for connecting up the carburetor to maintain supercharger pressure therein, and means for maintaining supercharger pressure in said container.

4. In combination with an automotive vehicle having an internal combustion engine and a fuel container, a carburetor and a vacuum tank associated with said engine, said tank adapted to draw fuel from the container to supply the carburetor, a supercharger operatively connected with said engine, means to maintain supercharger pressure in said tank and in said fuel container, and means to maintain supercharger pressure in the carburetor.

5. In combination with an automotive vehicle having an internal combustion engine and a fuel container, a carburetor associated with said engine, a tank connected to the intake manifold of the engine to draw fuel from the container to supply the carburetor, a supercharger operatively connected with said engine, a pipe leading from the supercharger to the tank to maintain supercharger pressure therein, and a pipe leading from the supercharger to the fuel container and carburetor to maintain supercharger pressure at both.

In testimony whereof I affix my signature.

JOHN O. ALMEN.